(12) United States Patent
Congdon et al.

(10) Patent No.: US 6,359,759 B1
(45) Date of Patent: Mar. 19, 2002

(54) AERODYNAMIC FLY-HEIGHT AND TURBULENCE CONTROL FOR HARD DISK DRIVE HEADS USING MICROACTUATORS

(75) Inventors: Philip A. Congdon, Richardson; Tsen-Hwang Lin, Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/134,773

(22) Filed: Aug. 15, 1998

Related U.S. Application Data

(60) Provisional application No. 60/055,620, filed on Aug. 14, 1997.

(51) Int. Cl.[7] ................................................. G11B 5/60
(52) U.S. Cl. ..................................................... 360/294.7
(58) Field of Search ...................................... 360/294.7

(56) References Cited

U.S. PATENT DOCUMENTS

| | | | | |
|---|---|---|---|---|
| 5,896,246 A | * | 4/1999 | Budde et al. ................ | 360/104 |
| 6,002,552 A | * | 12/1999 | Leung ......................... | 360/104 |
| 6,072,151 A | * | 6/2000 | Jurgenson et al. ..... | 219/121.85 |

* cited by examiner

*Primary Examiner*—George J. Letscher
(74) *Attorney, Agent, or Firm*—W. Daniel Swayze, Jr.; W. James Brady; Frederick J. Telecky, Jr.

(57) ABSTRACT

A disk rotates and information is stored on the disk. An arm accesses the information and a fly height controller controls the height of the arm with respect to the disk as the disk rotates.

8 Claims, 4 Drawing Sheets

AERODYNAMIC FLY-HEIGHT AND TURBULENCE CONTROL FOR HARD DISK DRIVE HEADS USING MICROACTUATORS

This application claims priority under 35 USC §119(e)(1) of provisional application No. 60/055,620 filed Aug. 14, 1997.

TECHNICAL FIELD OF THE INVENTION

The present invention relates to controlling hard disk drives and more particularly to controlling the fly-height of a head or a magnetic transducer.

BACKGROUND OF THE INVENTION

Disk drives are commonly used in workstations, personal computers, laptops and other computer systems to store large amounts of data in a form that can be made readily available to the user. In general, a disk drive includes a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface. Typically, each data track is divided into a number of data sectors that can store fixed size data blocks.

A head includes an interactive element, such as a magnetic transducer, that is used to sense the magnetic transitions to read data or that is used to conduct an electronic signal that causes a magnetic transition on the disk surface to write data.

The magnetic transducer is positioned with the active elements of the transducer at a position suitable for interaction with the magnetic transitions on the surface of the disk as the disk rotates. This positioning is performed with an actuator arm or in an actuator.

Furthermore, as the disk rotates, a wind is generated by the magnetic disk. The wind is uneven with respect to intensity and direction. Thus, the magnetic transducer flies an unpredictable course above the surface of the disk. The height above the surface of the disk is known as the fly height. This fly height varies as a result of the uneven characteristics of the wind generated by the movement of the magnetic disk. If the fly height above the magnetic disk becomes too high, then the head is unable to write or read the magnetic transitions on the surface of the disk. This wastes time because another rotation of the magnetic disk is required for the head to settle to a suitable height.

As the disk reaches a constant rotational speed, the velocity of the wind should be relatively established. A gap between the head and element are small usually on the order of a few micros. With this size disk surface morphology may be uneven. This disk surface morphology, the absence of precise air movement control and the variation of air density with respect to time and altitude affect fly height control.

Consequently, a need has arisen for control of the height of the magnetic transducer and head above the media as the magnetic transducer or head flies above the surface of the disk surface.

Additionally, the recording density of the magnetic disk has increased over the years. With increasing density of the magnetic disk, the requirement for fly height has decreased to 100 nanometers to 70 nanometers (and will decrease more), and thus, accurate control of the actual height has become more necessary.

A delta wing of an airplane is a fundamental configuration for generating lift forces and its aerodynamic is of great importance to the aerodynamic society. Micro-machine actuators are used as microflaps and placed along the two leading edges at the bottom of the wing.

SUMMARY OF THE INVENTION

The present invention provides a mechanism for lifting or depressing the actuator as the magnetic transducer travels over the surface of the magnetic disk. The present invention measures the actual fly height and determines an error signal and corrects the suspension including the head based on the error signal. The present invention utilizes a movable aerodynamic element to change the fly height of the magnetic transducer. The present invention also utilizes an array of movable aerodynamic elements to further control they fly height of the magnetic transducer.

DESCRIPTION OF PREFERRED EMBODIMENTS OF THE PRESENT INVENTION

Figure 1A:
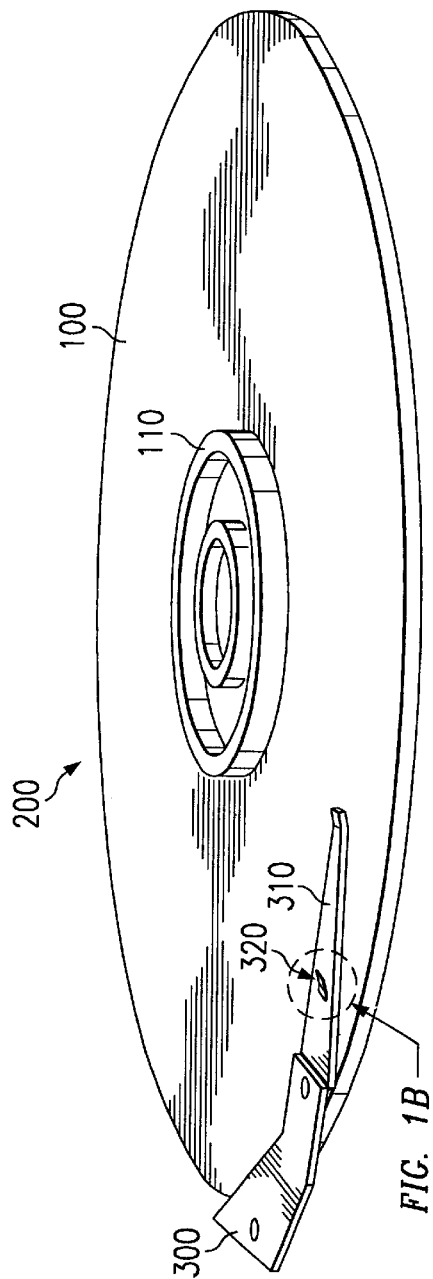
FIG. 1 illustrates a perspective view of the movable actuator element.
Figure 1B:
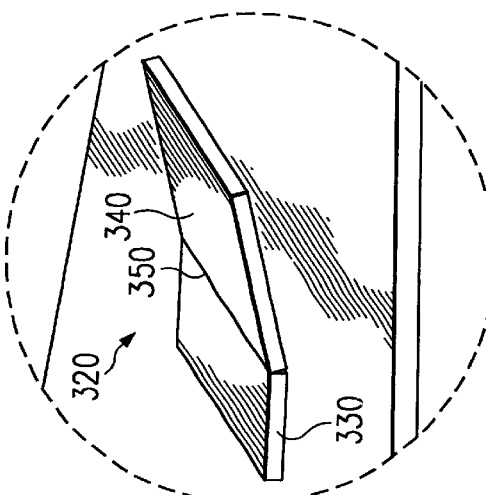

FIG. 1 illustrates a system 200 for fly height control. A magnetic disk 100 rotates at a high rate of speed about a hub 110. As the magnetic disk 100 rotates, about the hub 110, at a high rate of speed, wind (not shown) forms along the surface of the magnetic disk 100. A flex 3OO is connected to a suspension gimble head assembly 310. A base 320 is mounted and positioned on the suspension gimble head assembly 310. The movable aerodynamic element 340 pivots about edge 350. The movable aerodynamic element 350 moves from a closed position substantially parallel to the base 330 to an open position substantially perpendicular to base 330. While in the closed position, the fly height controller 320 does not affect fly height control. The fly height controller 320 is positioned opposite the surface of the disk. While in the open position, the fly height controller lifts the suspension gimble head assembly 310. Positioning the fly height controller on the other side of the suspension gimble head assembly 310 would depress the suspension gimble head assembly 310.

Figure 2:
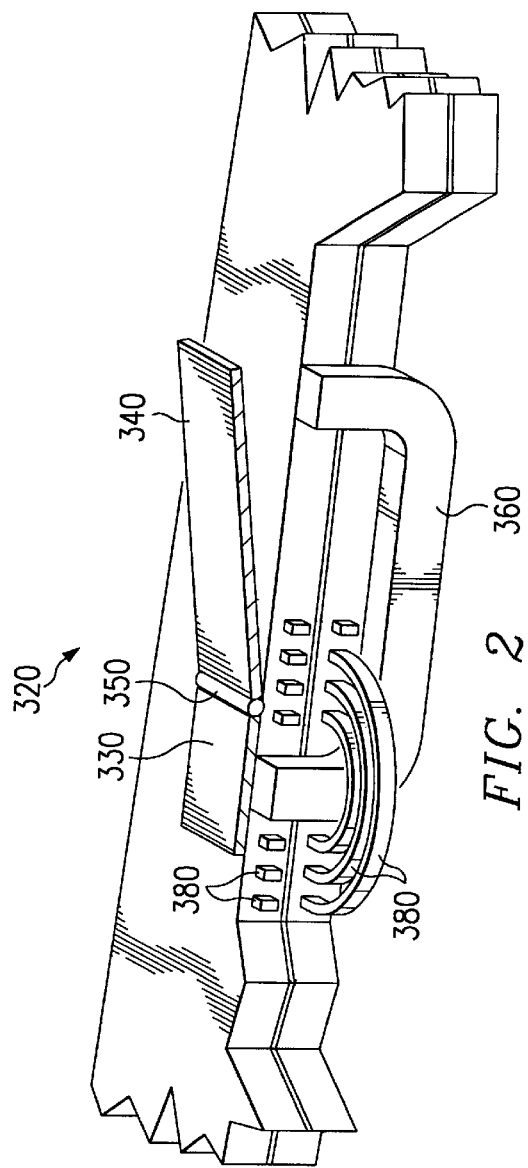
FIG. 2 illustrates a suspension with a fly height controller.

FIG. 2 illustrates a perspective view of the fly height controller.

Figure 3:
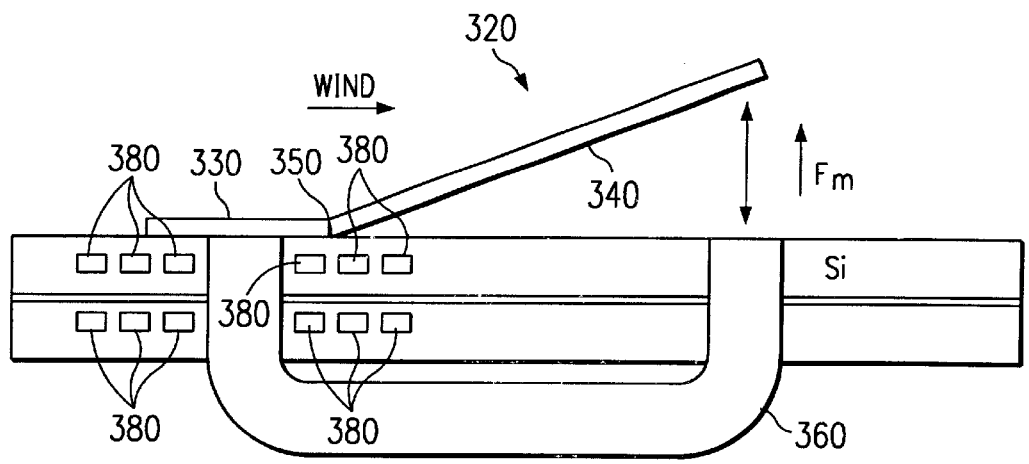
FIG. 3 illustrates the details of the fly height controller.

FIG. 3 illustrates the fly height controller 320. A base 330 is positioned to form a connection for the movable aerodynamic element 340. The movable aerodynamic element 340 pivots about an edge 350. The amount of movement of the movable aerodynamic element corresponds to the electromagnetic force generated by electromagnet 360. The movable aerodynamic movable element 340 is permanently magnetized, and the magnet 360 generates a magnetic field of the same polarity as the movable aerodynamic element 340. As a consequence, the movable aerodynamic element 340 is repelled by the magnetic force Fm. However, the wind acts to force the movable aerodynamic element in the opposite direction. Additionally, FIG. 3 illustrates coils 380 to energize the magnetic 360. By controlling the current through these coils 380, the magnetic force is controlled. The number of coils 380 are arbitrary, and the amount of current flowing through coils 360 controls the force (Fm) that magnetic 360 is able to impart to movable aerodynamic element 340.

Figure 4:
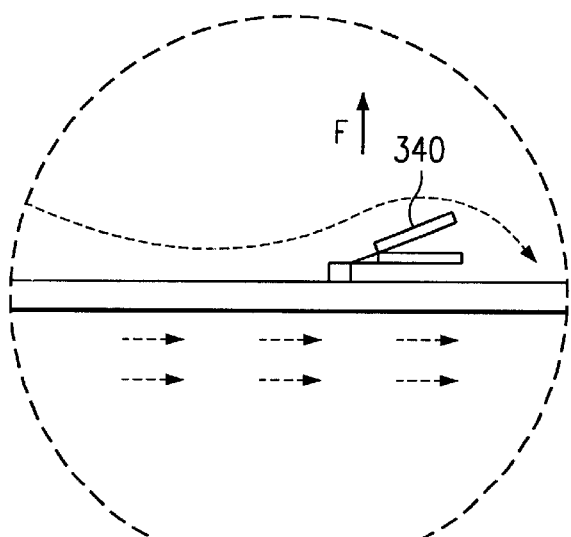
FIG. 4 illustrates a first side view of the fly height controller.

FIG. 4 illustrates the movable aerodynamic element 340 partially opened. The force F is the lift generated by the movable aerodynamic element 340. The movable aerodynamic element 340 can be opened 90 degrees from the base 330.

Figure 5:
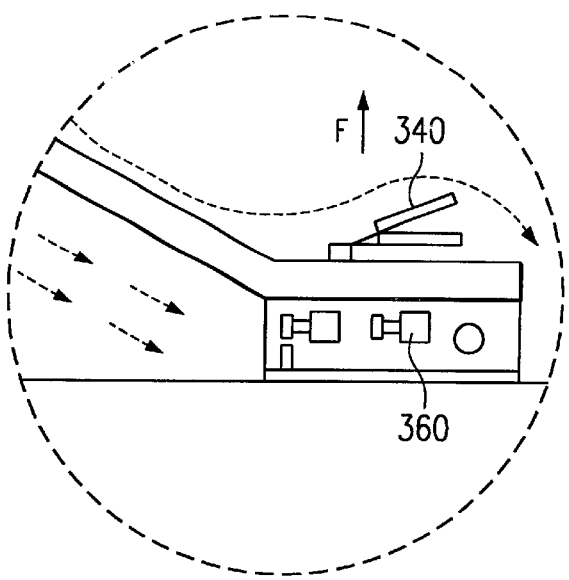
FIG. 5 illustrates a second side view of the fly height controller.

FIG. 5 illustrates magnetic 360 with the movable aerodynamic element 340.

Figure 6:
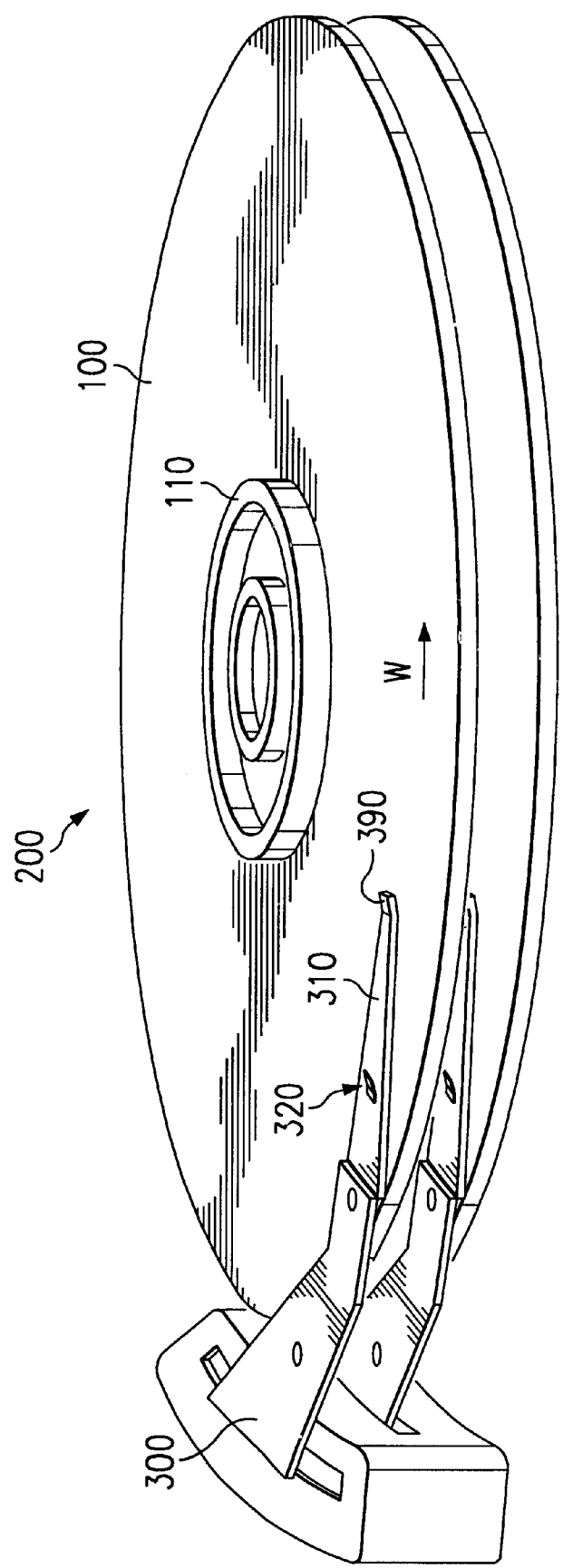
FIG. 6 illustrates a perspective view of a disk system with the fly height controller.

FIG. 6 illustrates the system 200 for fly height control. A magnetic disk 100 rotates around hub 110. A flex 300 is connected to a suspension gimble head assembly 310. The fly height controller 320 is positioned on the suspension gimble head 310. The fly height of the magnetic transducer 390 located along the end of suspension gimble head assembly 310 is determined by the signal generated from the magnetic transitions located on the magnetic disk 100. This height is determined by a processor (not shown). This fly height is compared with a desired fly height, and consequently if a deviation from the desired fly height is detected the movable aerodynamic element 340 is moved to eliminate the deviation. If the fly height is too high, the movable aerodynamic element 340 is retracted and the lift is reduced to lower the suspension gimble head assembly 310 towards the magnetic disk 100. If the fly height is low, the movable aerodynamic element 340 is extended, and the lift raises the suspension gimble head assembly 310. When sufficient height is attained, the movable aerodynamic element 340 is returned parallel to the base 330, and the vertical movement of the suspension head gimble 310 should stop. The movable aerodynamic element 340 could be used to push down on the suspension gimble element 310.

Figure 7:
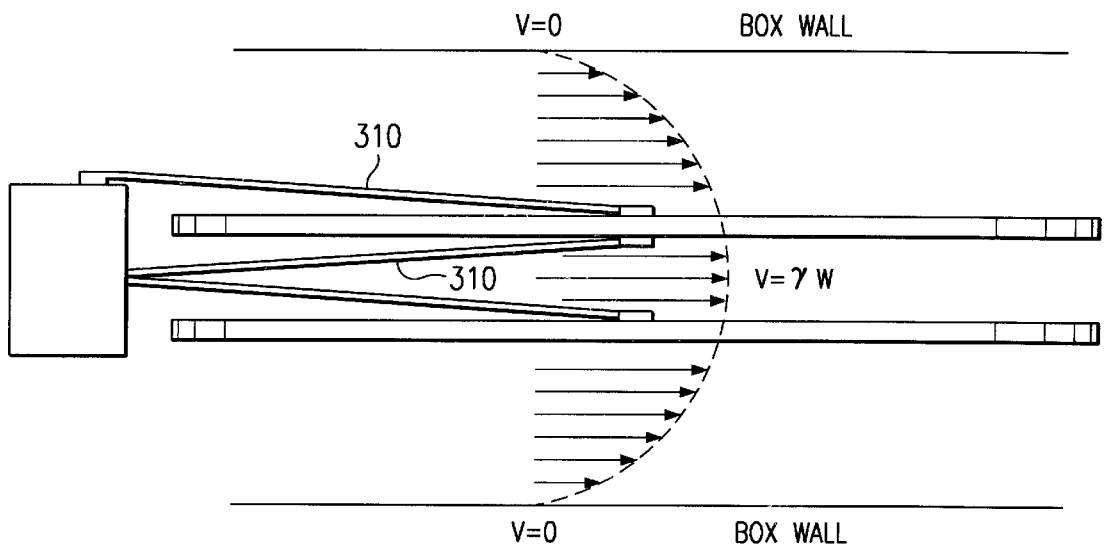
FIG. 7 illustrates a side view of the fly height controller.

FIG. 7 illustrates a side view of the suspension gimble head assembly 310.

The magnetic coil is formed as follows: A thick (2.5 $\mu$m) phosphosilicate glass (PSG) sacrificial layer with a measured 6 percent phosphorous content is first deposited on a wafer surface using low pressure chemical vapor deposition (LPCVD) followed by a 600 Å thick LPCVD polysilicone deposition at 620 degrees C. In order to dope the polysilicon layer, the wafer is coated with another 5000 Å of PSG and then annealed at 950 degrees C. for one hour to release intrinsic stress. During the annealing, the polysilicon is doped by phosphorous diffusion and the resulting sheet resistivity is measured at 50.5 $\Omega$. The top PSG is subsequently removed and the polysilicone is patterned by photolithography. A layer of 3000 Å LPCVD low stress silicon nitride is deposited at 820 degrees C. to cover the polyplate for insulation and then pattern the nitride to have contact holes. Aluminum layer may be deposited by evaporation to form the coils. A buffered hydrofluoric acid (BHF) and an oxide pattern etched is used to etch the sacrificial layer. As an alternative, CR/AU metallization is used due to chemical stability in HF. A 100 Å chromium layer and a 4000 Å gold layer form the metallization. A HF can be used to undercut the plate structure without damaging the metallization. The wafer is rinsed in de-ionized wafer for about 20 minutes and in acetone and then alcohol for one minute each. The wafer is then baked by an infrared lamp. The moveable aerodynamic element 340 may be manufactured by a polysilicon layer on top of 0.3 $\mu$m that phosphosilicate glass (PSG) sacrificial layer covered by another .05 $\mu$m thick PSG layer which serves as a complimentary phosphorous doping source. During a one hour, 1050 degrees C. stress-relief annealing, the polysilicon is doped from both sides to avoid intrinsic bending due to an unbalanced doping concentration. The PSG layer is later removed by a buffered hydrochloric acid (BHF). A 200 Å Cr and an 1800 Å Cu thin film are then evaporated over the polysilicone as a conductive seed layer for electroplating. A 5 $\mu$m thick photoresist is applied and patterned to form molding frames, inside which permalloy ($Ni_{80}Fe_{20}$) electroplating takes place. This frameplating technique creates a high quality permalloy film. The wafer is affixed to a cathode during the plating process and is oriented in such a way that the external magnetic field is parallel to the supporting beams. Electroplating takes place at 5 $\mu$m per hour under a bias-current density of 800 mA/cm$^2$. The resulting permalloy has a standard saturated magnetization of 1.35 Tesla, a relative permeability of 4500, a small remnant magnetization between 1 and 10 Gauss and a coercive force of 4 Oe.

Figure 8:
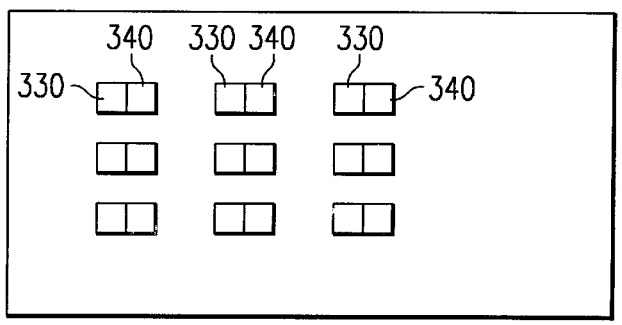
FIG. 8 illustrates an array of fly-height controllers.

After electroplating, the wafer is flood exposed with ultraviolet and a frame resist is removed. The seed layer is etched away by using a Cu etchant and a standardized Cr mask etchant. Flaps are then released by 50 percent HF in 20 minutes. All permalloy plates stand well in hydrochloric as well as Cu and Cr etchant. To facilitate the sacrificial release process, etch holes are opened in the plate. The moveable aerodynamic elements are approximately 2 millimeters square. FIG. 8 illustrates an array of movable aerodynamic elements 340. Each of these elements can be individually activated and deactivated to provide the desired aerodynamic effects.

Other methods could be employed with the present invention.

What is claimed is:

1. An apparatus for fly height control, comprising:
   a rotating disk to store information;
   an arm to access said information on said disk;
   a fly height controller to control the height of said arm with respect to said disk as said disk rotates; wherein said fly height controller moves an aerodynamic element to change the height of said arm and wherein said aerodynamic element is moved electromagnetically.

2. An apparatus for fly height control, as in claim 1, wherein said fly height controller aerodynamically changes the height of said arm.

3. An apparatus for fly height control, as in claim 2, wherein said aerodynamic element is pivoted to change the height of said arm.

4. An apparatus for fly height control, as in claim 3, wherein said aerodynamic element pivots substantially 90 degrees.

5. A method for fly height control, comprising the steps of:
   rotating a disk, said disk storing information;
   accessing said information by an arm;
   controlling the height of said arm with respect to said disk as said disk rotates; wherein said method further comprises the step of moving said fly height controller with an aerodynamic element to change the height of said arm and wherein said method further comprises the step of moving said aerodynamic element electromagnetically.

6. A method for fly height control, as in claim 5, further comprising the step of aerodynamic changing the height of said arm.

7. A method for fly height control, as in claim 6, wherein said method further comprises the step of pivoting said aerodynamic element to change the height of said arm.

8. A method for fly height control, as in claim 7, wherein said aerodynamic element pivots substantially 90 degrees.

* * * * *